(12) United States Patent
Russell

(10) Patent No.: US 9,883,630 B2
(45) Date of Patent: Feb. 6, 2018

(54) NUT WINDROW GATHERER

(71) Applicant: Cody Russell, Shafter, CA (US)

(72) Inventor: Cody Russell, Shafter, CA (US)

( * ) Notice: Subject to any disclaimer, the term of this patent is extended or adjusted under 35 U.S.C. 154(b) by 0 days.

(21) Appl. No.: 15/176,666

(22) Filed: Jun. 8, 2016

(65) Prior Publication Data

US 2016/0345495 A1   Dec. 1, 2016

Related U.S. Application Data

(63) Continuation of application No. 15/157,601, filed on May 18, 2016, now abandoned.

(60) Provisional application No. 62/168,990, filed on Jun. 1, 2015.

(51) Int. Cl.
*A01D 51/00* (2006.01)

(52) U.S. Cl.
CPC .................. *A01D 51/002* (2013.01)

(58) Field of Classification Search
CPC .... A01D 51/00; A01D 51/002; A01D 51/005; A01D 51/007; A01D 33/105
USPC .............. 56/328.1, 329, 332, 350, 368, 378; 405/179; 37/142.5
See application file for complete search history.

(56) References Cited

U.S. PATENT DOCUMENTS

| | | | | |
|---|---|---|---|---|
| 2,833,429 A | * | 5/1958 | Shoemaker | A01D 51/00 414/132 |
| 3,139,201 A | * | 6/1964 | Rolfes | A01D 51/005 414/715 |
| 3,520,727 A | * | 7/1970 | Crump | A63B 47/021 134/115 R |
| 3,593,868 A | * | 7/1971 | Folz | A63B 47/021 414/440 |
| 3,693,331 A | | 9/1972 | Richter et al. | |
| 3,698,169 A | * | 10/1972 | Simpson | A01D 51/002 15/78 |
| 4,158,418 A | * | 6/1979 | Hayashi | A63B 47/021 414/440 |
| 4,202,158 A | * | 5/1980 | Edwards | A01D 46/264 56/328.1 |
| 4,249,367 A | * | 2/1981 | Layman | A01D 84/00 56/365 |
| 4,364,222 A | | 1/1982 | Ramacher | |
| 4,905,466 A | | 3/1990 | Heppner | |
| 4,912,916 A | * | 4/1990 | Parsons, Jr. | A01D 34/866 56/15.2 |
| 5,231,740 A | | 8/1993 | Mohebkhosravi | |
| 5,404,702 A | | 4/1995 | Lewis | |
| 5,826,309 A | | 10/1998 | Tsamas | |

(Continued)

*Primary Examiner* — John G Weiss
(74) *Attorney, Agent, or Firm* — Global Intellectual Property Agency, LLC; Jordan Sworen

(57) ABSTRACT

A nut windrow gatherer for use in organizing and shaping the end of a nut windrow. The present system has a housing with two sidewalls, a rear spoiler plate, and two splayed arms affixed to a front side of the housing. There is a support arm configured to mount the housing to a vehicle and adapted to adjust the pitch and roll of the housing to ensure that the bottom surfaces of the splayed arms are in constant contact with the orchard floor. When the housing is controlled by a vehicle, the sidewalls and rear spoiler plate are configured to gather nuts that are spread out on an orchard floor and transport them in order to reduce the length of a nut windrow, leaving sufficient room for harvesting equipment to maneuver into an orchard throughway.

13 Claims, 7 Drawing Sheets

(56) References Cited

U.S. PATENT DOCUMENTS

| | | | |
|---|---|---|---|
| 6,088,884 A | 7/2000 | Hentz | |
| 6,139,223 A * | 10/2000 | Snyder | A01C 5/066 |
| | | | 172/509 |
| 6,341,478 B1 * | 1/2002 | Sallstrom | A01D 43/063 |
| | | | 56/199 |
| 6,725,942 B2 * | 4/2004 | Stevens | A01B 77/00 |
| | | | 172/118 |
| 6,851,484 B2 * | 2/2005 | Klompien | E02F 3/7627 |
| | | | 172/191 |
| 7,536,757 B2 | 5/2009 | Tan | |
| 2008/0092411 A1 * | 4/2008 | Guth | E02F 7/06 |
| | | | 37/142.5 |
| 2011/0185768 A1 | 8/2011 | Pinchuk | |
| 2015/0068186 A1 * | 3/2015 | McIlhatton | A01D 51/002 |
| | | | 56/328.1 |
| 2015/0082762 A1 * | 3/2015 | Silcock | A01G 23/095 |
| | | | 56/235 |

\* cited by examiner

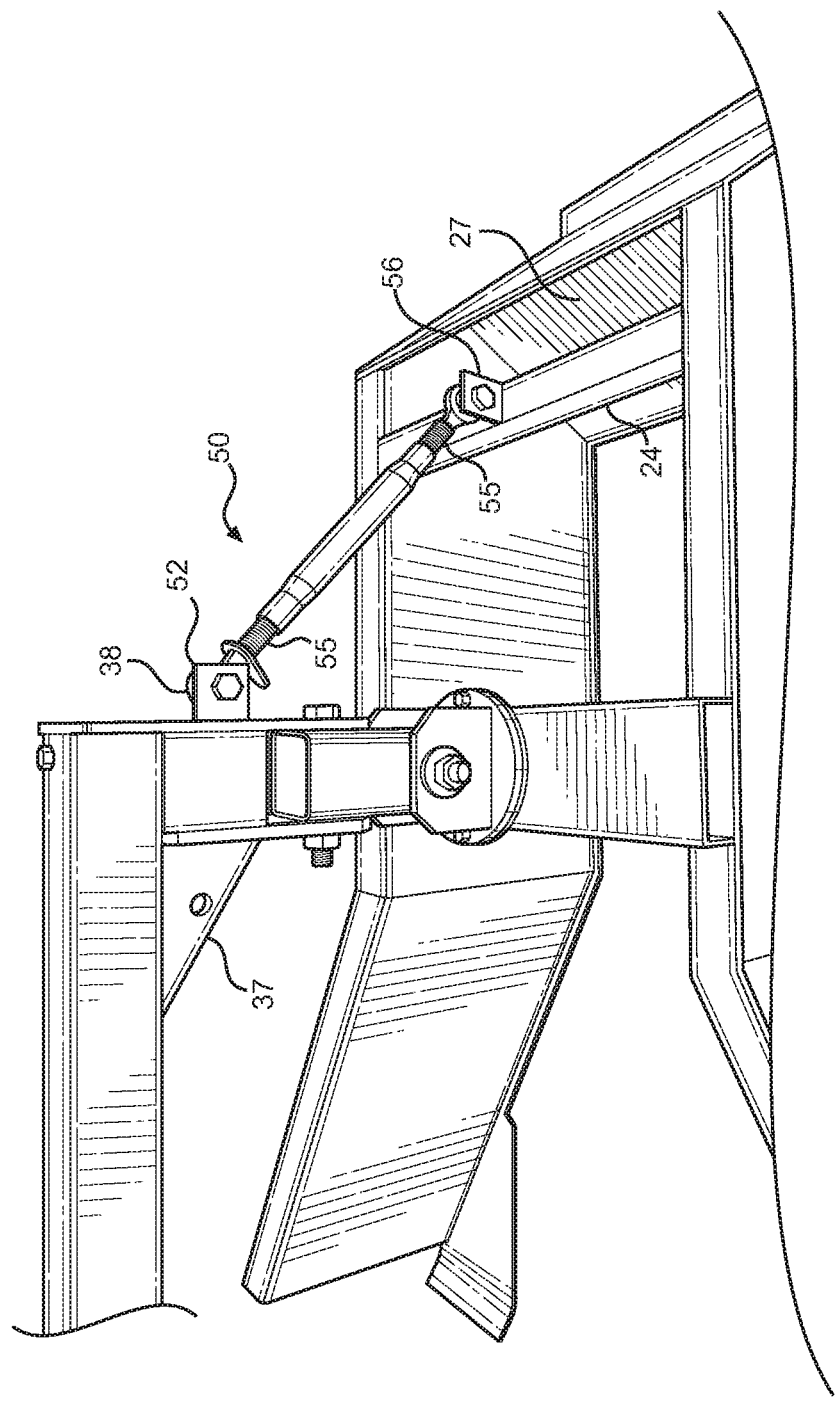

NUT WINDROW GATHERER

CROSS REFERENCE TO RELATED APPLICATIONS

This application is a continuation of U.S. patent application Ser. No. 15/157,601 filed on May 18, 2016, which claims the benefit of U.S. Provisional Application No. 62/168,990 filed on Jun. 1, 2015. The above identified patent application is herein incorporated by reference in its entirety to provide continuity of disclosure.

BACKGROUND OF THE INVENTION

The present invention relates to a nut gatherer. More specifically, the present invention relates to a nut gatherer that is configured to collect and transport nuts that have been dispersed at the end of a nut windrow.

As with any crop, nuts must be harvested from the field once they have become ripe. After the nuts haven fallen or are shaken off of trees, the nut farmer gathers the produce into a single row called a windrow for more efficient collection. While there are current devices in the prior art that are designed to create this windrow, many of these devices have difficulty in arranging the ends of the windrow due to certain design constraints. One such limitation is that many of the tools designed to shape a nut windrow are mounted onto a vehicle and can only be used in a single direction. If used in the opposite direction, the wheels of the vehicle will overrun and crush the produce. The present solution to this problem is either to manually rake the nuts or use a blower to move the nuts at the ends of the fields back toward the windrow. This is both time consuming and an expensive use of a farmer's resources.

While traditional tractors are designed to move and arrange large objects such as bales, they lack the ability to control large amounts of smaller items, such as nuts that are often gathered in a windrow. Certain tractor attachments exist in the prior art to address this issue, but many require complicated mechanisms, such as winnowing devices and hydraulic devices, which are expensive to both produce and upkeep.

SUMMARY OF THE INVENTION

In view of the foregoing disadvantages inherent in the known types of windrows movers now present in the prior art, the present invention provides a nut windrow gatherer wherein the same can be utilized for providing convenience for the user when the user wishes to organize and shape the end of a windrow. The present system comprises a housing having two sidewalls, a rear spoiler plate, two splayed arms affixed to one side of the housing, and a support arm configured to mount the housing to a vehicle. The housing is configured to collect nuts that are spread out on an orchard floor and transport them to the end of a windrow. The support arm is configured to adjust the pitch and roll of the housing to ensure that the bottom surfaces of the splayed arms and sidewalls are in constant contact with the orchard floor.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 4 shows a perspective view of an embodiment of the nut windrow gatherer with a stabilizing link.

DETAILED DESCRIPTION OF THE INVENTION

Figure 1A:
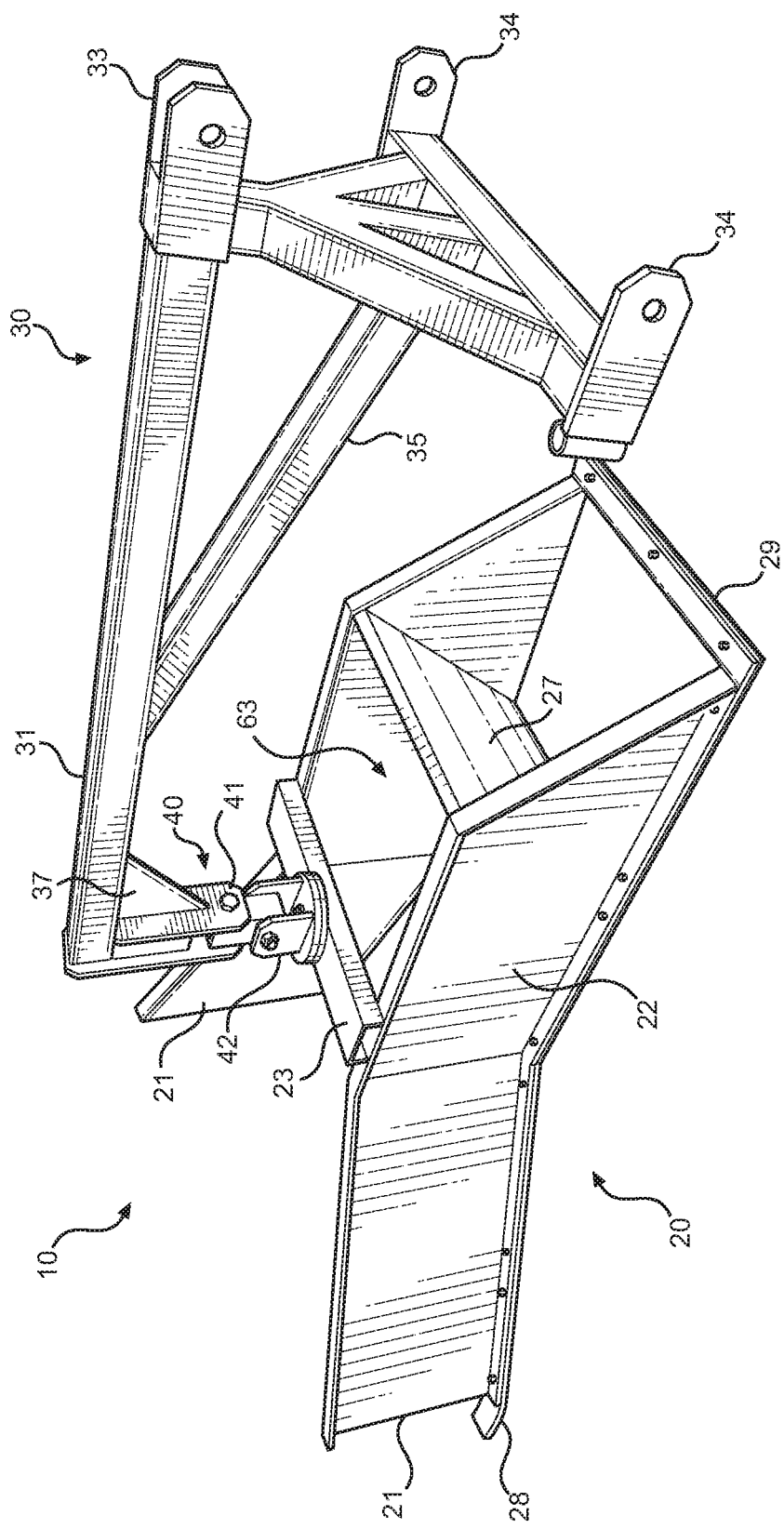
FIG. 1A shows a perspective view of an embodiment of the nut windrow gatherer.

Reference is made herein to the attached drawings. Like reference numerals are used throughout the drawings to depict like or similar elements of the nut windrow gatherer. The figures are intended for representative purposes only and should not be considered to be limiting in any respect.

Figure 1B:
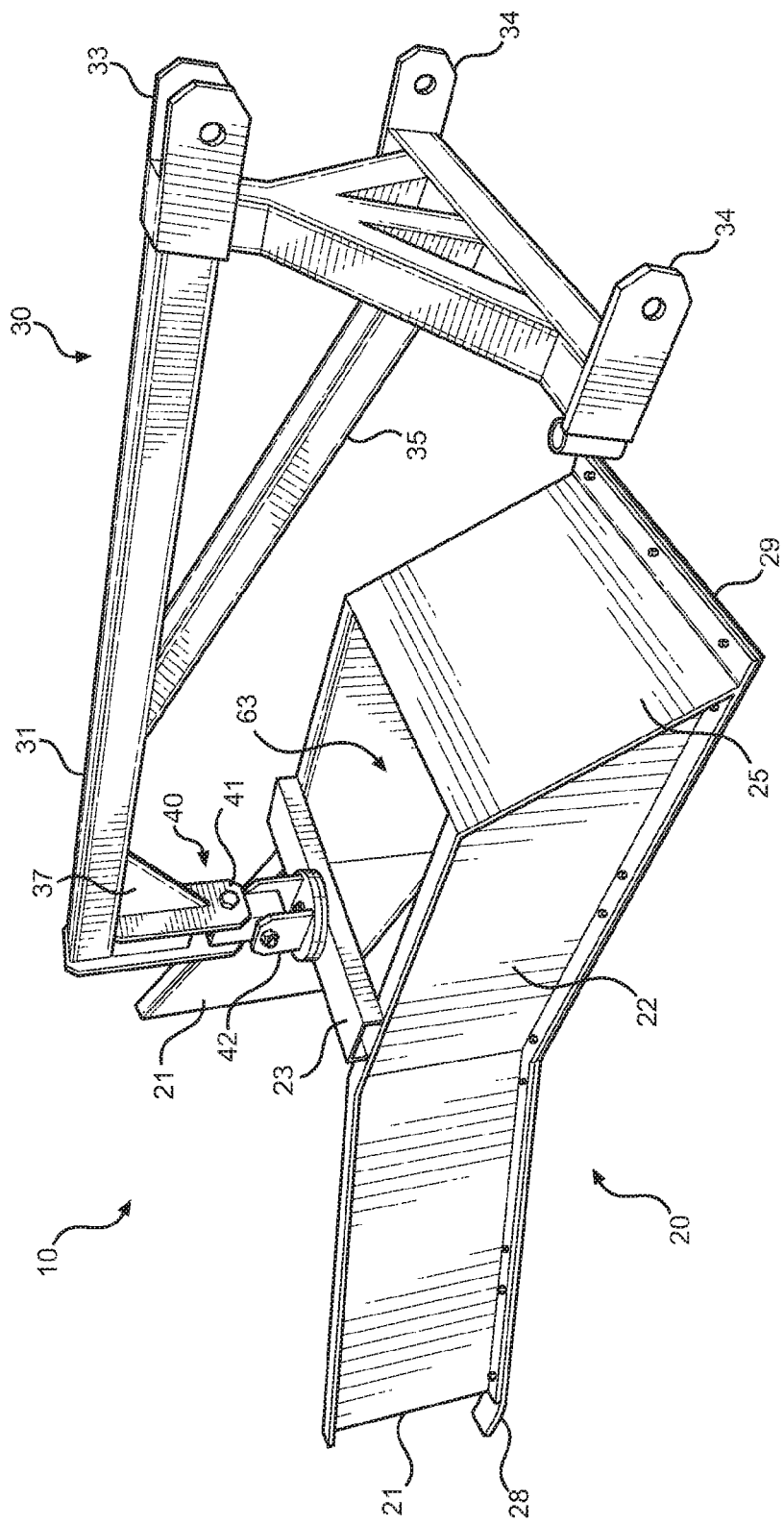
FIG. 1B shows a perspective view of an alternative embodiment of the nut windrow gatherer with a backplate.

Referring now to FIGS. 1A and 1B there are shown perspective views of an embodiment of the nut windrow gatherer. The nut windrow gatherer 10 comprises a nut gathering unit 20 and a support unit 30 that are adjustably connected with a hinge 40. The nut gathering unit 20 comprises two sidewalls 22 separated by a space so as to define an interior volume 63 therebetween. The sidewalls 22 have splayed arms 21 disposed on an open front end at an obtuse angle relative to the interior volume 63, and a spoiler plate 27 disposed on a closed rear end of the interior 63. The spoiler plate 27 is slanted such that a top portion of the spoiler plate 27 is closer to the closed end of the interior 63 than a bottom portion of the spoiler plate 27.

The nut gathering unit 20 is adapted to be drawn over the floor of a nut field with the open end of the splayed arms 21 facing the direction of movement of the gathering unit 20. As the nut gathering unit 20 is drawn forward, the splayed arms 21 come in contact with the nuts and act as a funnel to draw the collected nuts toward the interior 63 of the housing. The nuts are gathered within the interior 63 by sidewalls 22 and the spoiler plate 27 and are transported toward the end of a windrow through the movement of a vehicle.

Once the gathered nuts have been satisfactorily placed at the end of a windrow, the gathering unit 20 is reversed away from the windrow, causing the sidewalls 22 to create a uniformly shaped pile of nuts at the end of the windrow. The bottom portion of the spoiler plate 27 is positioned father from the ground than the bottom portions of the sidewalls 22 and the splayed arms 21 to permit debris to pass under the spoiler plate 27 while gathering the desired nuts. In some embodiments of the nut gathering unit 20, there is a backplate 25 that is positioned perpendicular to the sidewalls 22 and disposed at the closed end of the housing. The bottom portion of the backplate 25 is positioned at the same level as the bottom portions of the sidewalls 22 and splayed arms 21 and configured to collect any nuts that have passed under the spoiler plate 27.

In further embodiments of the nut gathering unit 20, there is a skid plate 29 that is disposed on a lower end of the housing, along the sidewalls 22, the splayed arms 21 and the backplate 25. The skid plate 29 is configured to reduce wear on the sidewalls 22, the splayed arms 21, and the backplate 29, extending the useable life of the nut gathering unit 20. The skid plates 29 are secured onto the housing with fasteners such as screws that allow the skid plates 29 to be easily detached and replaced. The skid plates 29 are made from a durable material, such as steel, and adapted to withstand the physical demands of frequent contact with the ground of an orchard. In a further embodiment of the nut gathering unit 20, the front ends of the skid plates 29 located under the splayed arms 21 extend outward in an upward curved arc 28. This curved arc 28 is configured to prevent the front ends of the splayed arms 21 from digging into the topsoil of an orchard.

The support unit 30 has a first end that is configured to connect to the nut gathering unit 20, and a second end that is configured to connect to the hitch of a vehicle, such as a tractor. In some embodiments, the second end of the support unit 30 has three apertures 33, 34 configured to be mounted onto a tractor hitch with a fastening device such as a pin. In some embodiments of the support unit 30, there are support structures 35, 37 configured to increase the rigidity of the support unit 30.

The nut gathering unit 20 is connected to the support unit 30 via a joint 40. In some embodiments of the nut windrow gatherer 10, the nut gathering unit 20 further comprises a cross beam 23 disposed on the top of the housing and extending between the two sidewalls 22. The joint 40 comprises a lower hinge 42 that is mounted onto the cross beam 23, and an upper hinge 41, mounted onto the first end of the support unit 30. The lower hinge 42 is positioned perpendicularly to the upper hinge 41, allowing for movement of the nut gathering unit 20 relative to the support unit 30 in both pitch and roll. In an alternative embodiment of the nut windrow gatherer 10, the joint 40 comprises a ball and socket type joint allowing for movement of the nut gathering unit 20 relative to the support unit 30 in both pitch and roll.

Figure 2:
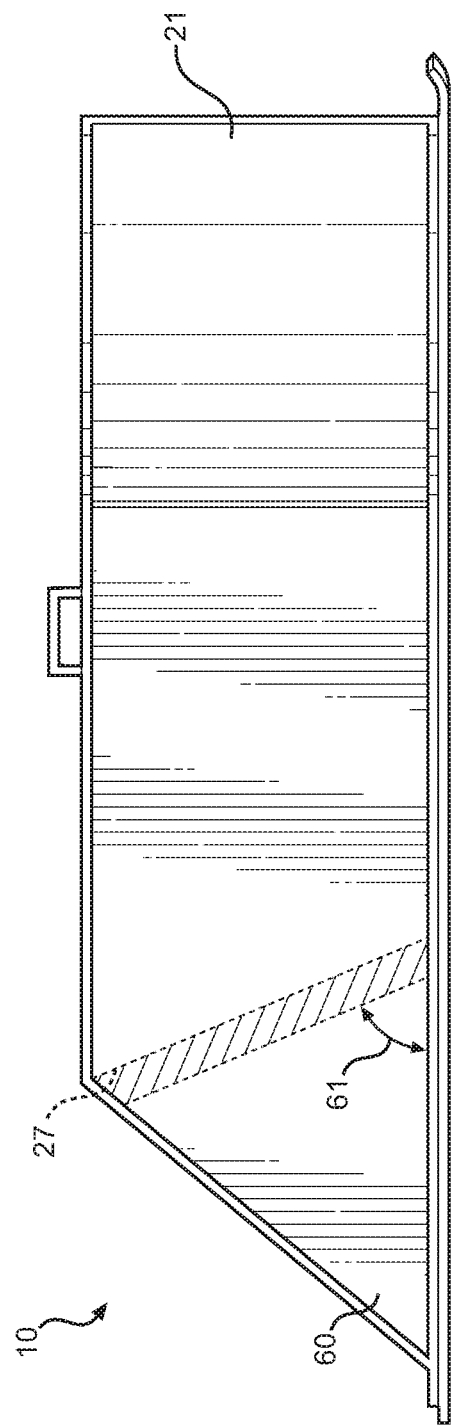
FIG. 2 shows a side view of an embodiment of the nut gathering unit.

FIG. 2 shows a side view of an embodiment of the nut windrow gathering unit 10. The spoiler plate 27 is positioned within the housing at an acute angle 61 relative to the ground of a rear space 60. As the nuts are directed into the interior from the splayed arms 21, they are blocked by the spoiler plate 27 and begin to pile up, pushing the spoiler plate 27 downward and ensuring that the housing maintains constant contact with the orchard floor. In some embodiments, this angle 61 is within the range of 35 degrees to 65 degrees relative to the rear space 60.

Figure 3:
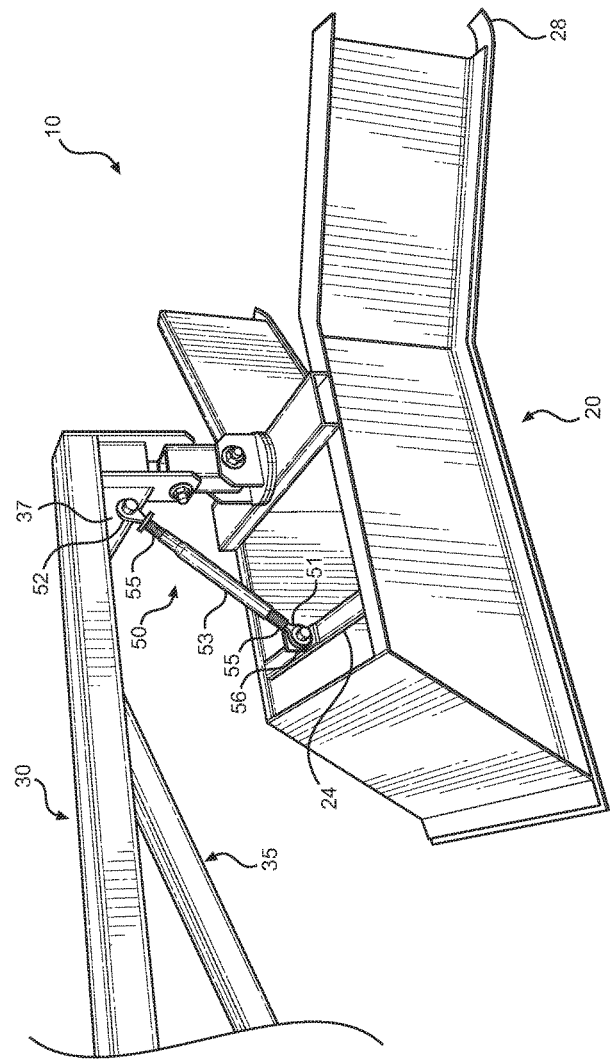
FIG. 3 shows a perspective view of an embodiment of the nut windrow gatherer with a stabilizing link.

Referring now to FIGS. 3 and 4, there are shown perspective views of an embodiment of the nut windrow gatherer with a stabilizing link. In some embodiments of the nut gathering unit 20, there is a secondary cross beam 24 that extends between the two sidewalls 22. A stabilizing link 50 is connected at a first end to a bracket 56 mounted onto the secondary cross beam 24, and at a second end to a support structure 37 of the support unit 30. In some embodiments of the nut windrow gatherer 10, the stabilizing link 50 is a turnbuckle device with a length that is configured to be adjusted by rotating a central section 53, thereby extending or retracting threaded ends 55 of the turnbuckle. This extension or retraction can adjust the pitch of the nut gathering unit 20 relative to the support unit 30 and to the ground. Once set, the stabilizing link 50 prevents the nut gathering unit 20 from movement in both the pitch and the yaw dimensions of motion.

Figure 5A:
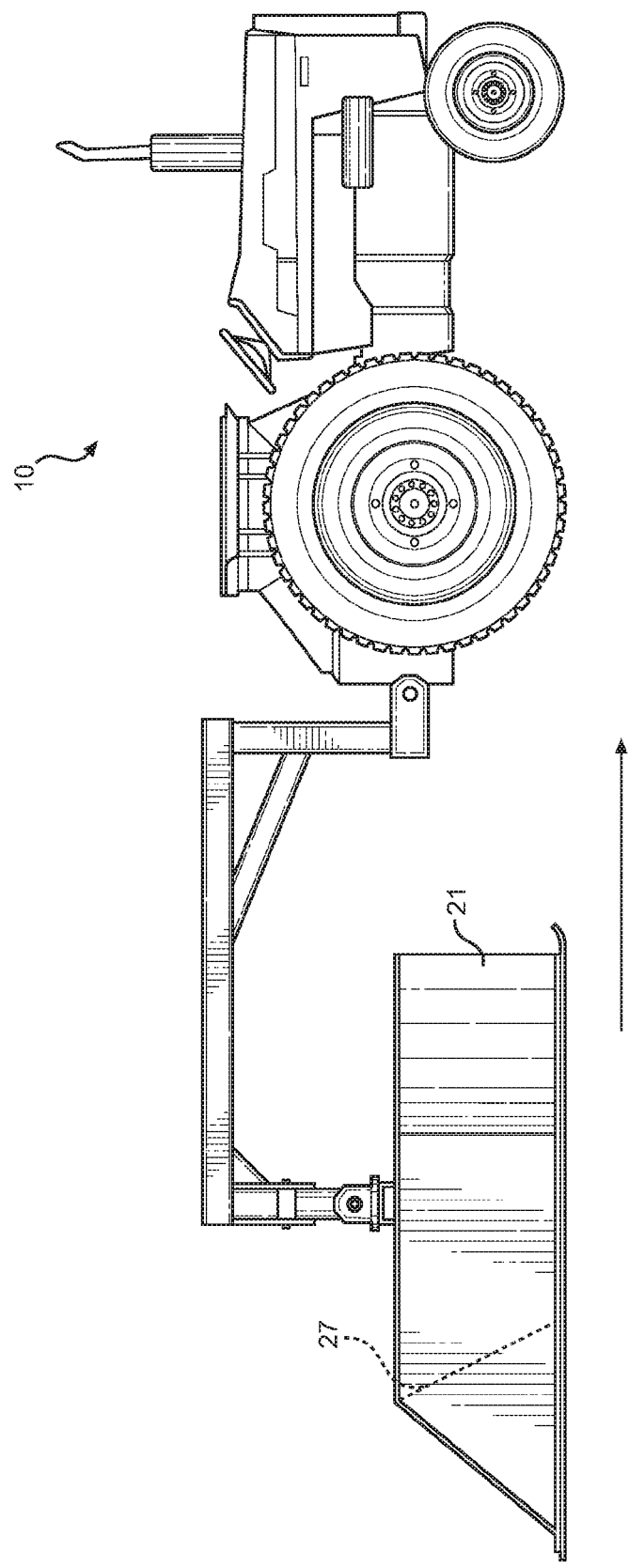
FIG. 5A shows a side view of an embodiment of the nut windrow gatherer hitched to the rear of a vehicle.
Figure 5B:
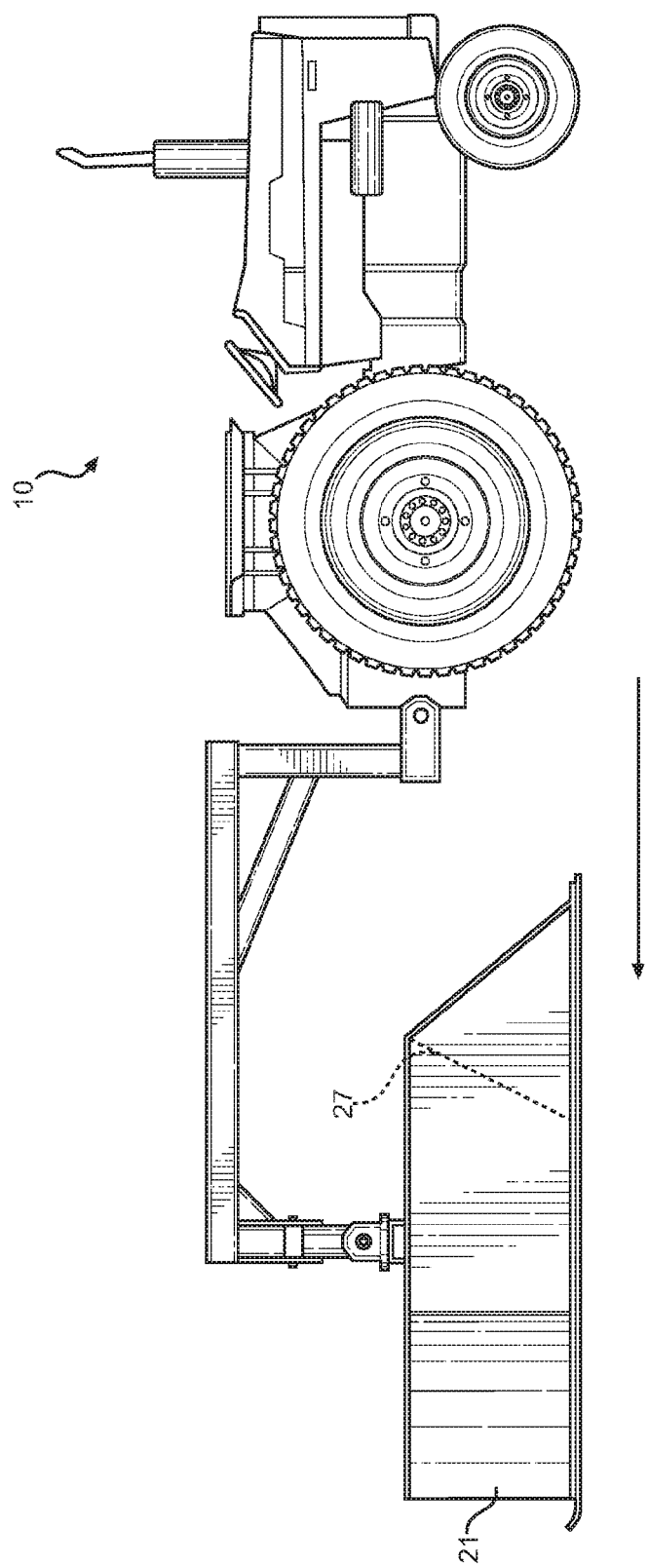
FIG. 5B shows a side view of an embodiment of the nut windrow gatherer hitched to the rear of a vehicle.

Referring now to FIGS. 5A and 5B, there are shown side views of an embodiment of the nut windrow gatherer hitched to the rear of a vehicle. In a forward drive configuration, the splayed arms 21 of nut windrow gatherer 20 face toward the rear of the vehicle in a forward direction. In a reverse drive configuration, the splayed arms 21 of nut windrow gatherer 20 face away from the rear of vehicle. In either configuration, the splayed arms 21 are faced in the direction of motion, and the spoiler plate 27 will come into contact with the nuts after the splayed arms 21 have collected the nuts into the housing. The wheels of a tractor are positioned farther apart than the width of a standard windrow, allowing the tractor to back into a windrow without the tractor wheel driving over and crushing the collected nuts.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A nut gathering unit, the gathering unit comprising:
   a housing having a first sidewall, a second sidewall, and a spoiler plate extending from the first sidewall to the second sidewall defining an interior with a closed end and an open end, wherein the spoiler plate is positioned perpendicular to the sidewalls at an angle such that a top portion of the spoiler plate is disposed closer to the closed end of the interior than a bottom portion of the spoiler plate;
   a first splayed arm disposed on the first sidewall adjacent to the open end of the housing, wherein the splayed arm extends outward from the first sidewall at an obtuse angle relative to the interior;
   a second splayed arm disposed on the second sidewall adjacent to the open end of the housing, wherein the splayed arm extends outward from the second sidewall at an obtuse angle relative to the interior;
   wherein the distance between a lateral side of a distal end of the first splayed arm and a lateral side of a distal end of the second splayed arm is larger than the distance between the first sidewall and second sidewall, and wherein the lateral side is a side opposite the interior.

2. The nut gathering unit of claim 1, wherein the first sidewall is positioned parallel to the second sidewall.

3. The nut gathering unit of claim 1, further comprising a backplate disposed on the closed end of the housing.

4. The nut gathering unit of claim 1, further comprising a skid plate disposed along a lower end of the housing, the first splayed arm, and the second splayed arm, wherein the skid plate is adapted to prevent wear on the lower end of the housing, the first splayed arm, and the second splayed arm.

5. The nut gathering unit of claim 4, wherein the skid plate extends outward in an upward curved arc from the first splayed arm and from the second splayed arm, the curved arc configured to prevent the first and second splayed arms from digging into soil.

6. The nut gathering unit of claim 1, further comprising a cross beam disposed on a top side of the housing, the cross beam extending from the first sidewall and the second sidewall.

7. A nut windrow gatherer, comprising:
- a housing having a first sidewall, a second sidewall and a spoiler plate extending from the first sidewall to the second sidewall defining an interior with a closed end and an open end, wherein the spoiler plate is positioned perpendicular to the sidewalls at an angle such that a top portion of the spoiler plate is disposed closer to the closed end of the interior than a bottom portion of the spoiler plate;
- a first splayed arm disposed on the first sidewall adjacent to the open end of the housing, wherein the splayed arm extends outward from the first sidewall at an obtuse angle relative to the interior;
- a second splayed arm disposed on the second sidewall adjacent to the open end of the housing, wherein the splayed arm extends outward from the first sidewall at an obtuse angle relative to the interior;
- wherein the distance between a lateral side of a distal end of the first splayed arm and a lateral side of a distal end of the second splayed arm is larger than the distance between the first sidewall and second sidewall, and wherein the lateral side is a side opposite the interior;
- a support arm with a first end and a second end;
- a mounting apparatus disposed on the second end of the support arm;
- a joint disposed at the first end of the support arm, the joint comprising a first hinge positioned perpendicular with a second hinge, the joint mounted onto the housing and configured to adjust pitch and roll of the housing relative to the support unit.

8. The nut windrow gatherer of claim 7, further comprising a cross beam disposed on a top side of the housing, the cross beam running between the first sidewall and the second sidewall.

9. The nut windrow gatherer of claim 7, wherein the open end of the housing is configured to face away from the second end of the support arm.

10. The nut windrow gatherer of claim 7, wherein the open end of the housing is configured to face toward the second end of the support arm.

11. The nut windrow gatherer of claim 8, wherein the joint is mounted onto the cross beam.

12. The nut windrow gatherer of claim 8, further comprising a stabilizing link, the stabilizing link configured to connect the support arm to the housing at a location other than the crossbeam.

13. The nut windrow gatherer of claim 8, wherein the stabilizing link is a turnbuckle configured to adjust the pitch angle of the housing.

* * * * *